(12) United States Patent
van Nieuwstadt

(10) Patent No.: US 6,449,945 B1
(45) Date of Patent: Sep. 17, 2002

(54) EMISSION CONTROL SYSTEM

(75) Inventor: Michiel Jacques van Nieuwstadt, Ann Arbor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/681,503

(22) Filed: Apr. 18, 2001

(51) Int. Cl.⁷ .................................................. F01N 3/00
(52) U.S. Cl. .............................. 60/286; 60/285; 60/274; 60/295; 60/297
(58) Field of Search ........................... 60/285, 286, 301, 60/274, 297, 303, 295

(56) References Cited

U.S. PATENT DOCUMENTS

| | | | |
|---|---|---|---|
| 4,403,473 A | 9/1983 | Gladden | |
| 4,854,123 A | 8/1989 | Inoue | |
| 5,201,802 A | 4/1993 | Hirota et al. | |
| 5,207,058 A * | 5/1993 | Sasaki et al. ................. | 60/284 |
| 5,209,061 A | 5/1993 | Takeshima | |
| 5,367,875 A | 11/1994 | Aboujaoude et al. | |
| 5,369,956 A | 12/1994 | Daudel et al. | |
| 5,410,873 A * | 5/1995 | Tashiro ......................... | 60/276 |
| 5,522,218 A | 6/1996 | Lane et al. | |
| 5,540,047 A | 7/1996 | Dahlheim et al. | |
| 5,609,022 A | 3/1997 | Cho | |
| 5,609,026 A | 3/1997 | Berriman et al. | |
| 5,628,186 A | 5/1997 | Schmelz | |
| 5,842,341 A * | 12/1998 | Kibe ............................ | 60/274 |
| 5,845,487 A | 12/1998 | Fraenkle et al. | |
| 5,884,476 A * | 3/1999 | Hirota et al. ................. | 60/278 |
| 5,924,280 A | 7/1999 | Tarabulski | |
| 5,941,067 A * | 8/1999 | Hirota et al. ................. | 60/286 |
| 5,950,422 A | 9/1999 | Dolling | |
| 6,021,640 A * | 2/2000 | Hirota et al. ................. | 60/300 |
| 6,082,102 A | 7/2000 | Wissler et al. | |
| 6,089,015 A | 7/2000 | Strehlau et al. | |
| 6,119,451 A | 9/2000 | Vogtlin et al. | |
| 6,125,629 A * | 10/2000 | Patchett ....................... | 60/286 |
| 6,233,925 B1 * | 5/2001 | Hirota et al. ................. | 60/285 |

* cited by examiner

*Primary Examiner*—Thomas Denion
*Assistant Examiner*—Binh Tran
(74) *Attorney, Agent, or Firm*—Julia Voutyras

(57) ABSTRACT

A method for improving NOx conversion efficiency of an exhaust gas after-treatment device is presented. The efficiency is improved by first maintaining the device at an operating temperature wherein improved storage of reductant is possible, and subsequently changing the temperature of the device to that where optimum NOx conversion efficiency is achieved, thereby obtaining and utilizing the conversion benefits of stored reductant.

18 Claims, 3 Drawing Sheets

EMISSION CONTROL SYSTEM

BACKGROUND OF INVENTION

The present invention relates to a system and a method for improving conversion efficiency of an active lean NOx catalyst in a diesel or lean burn gasoline engine, and, more particularly, to improving its conversion efficiency via controlled use of a NOx reductant.

Current emission control regulations necessitate the use of catalysts in the exhaust systems of automotive vehicles in order to reduce carbon monoxide (CO), hydrocarbons (HC), and nitrogen oxides (NOx) produced during engine operation. Vehicles equipped with diesel or lean burn gasoline engines offer the benefit of increased fuel economy. These vehicles may be equipped with lean exhaust aftertreatment devices such as "Active Lean NOx Catalysts" (ALNC). In order to achieve NOx reduction in the ALNC, a reductant, such as diesel fuel (HC) or urea, has to be added to the exhaust gas entering the device while the device is operating lean.

One approach to reducing NOx in the ALNC is described in U.S. Pat. No. 5,628,186, which uses urea to as a reductant. It teaches maintaining catalyst temperature within a predetermined range to achieve optimum NOx conversion efficiency. When the catalyst temperature exceeds a predetermined maximum temperature, it is cooled by an external cooler in order to bring it to the operating range where efficient NOx conversion is possible.

The inventor herein has recognized a disadvantage with this approach. In particular, the prior approach did not recognize that storing a reductant in the ALNC will greatly increase its NOx conversion rates efficiency, and further, improved storage of reductant in the ALNC occurs at temperatures lower than the temperatures at which peak NOx conversion efficiency occurs. Therefore, the prior approach of keeping the catalyst temperature in the optimum NOx conversion temperature range does not utilize the full conversion benefits of stored reductant.

SUMMARY OF INVENTION

An object of the present invention is to provide a system and a method for improving the conversion efficiency of an exhaust gas aftertreatment device by utilizing conversion benefits of a stored reductant.

In carrying out the above object and other objects, features and advantages of the present invention, a system and a method for improving conversion efficiency of an exhaust gas after-treatment device located downstream of an engine include the steps of: periodically creating a first operating condition while an exhaust gas entering the device is at an air-fuel ratio lean of stoichiometry; and injecting a reductant into the device during the first operating condition while the exhaust gas is at an air-fuel ratio lean of stoichiometry.

In another aspect of the present invention, the above object is further achieved, and disadvantage of prior approaches overcome, by a method for improving conversion efficiency of an exhaust gas after-treatment device coupled to an engine, the method consisting of: maintaining the device in a first operating range to store a reductant while an exhaust gas entering the device is at an air-fuel ratio lean of stoichiometry; and subsequently maintaining the device in a second operating range to release the stored reductant, thereby reducing an exhaust gas component while the exhaust gas is at an air-fuel ratio lean of stoichiometry.

An advantage of the above aspect of invention is that by keeping the exhaust gas aftertreatment device at temperatures below optimum NOx conversion efficiency in order to allow a predetermined amount of reductant storage, and then raising the temperature of the device to optimum NOx conversion temperature, NOx conversion efficiency of the device will be improved and it will more fully utilize the benefits of stored reductant.

The present invention provides a number of other advantages. In particular, An advantage of the present invention is that improved emission control can be achieved by varying the temperature of the ALNC and optimizing both reductant storage and NOx conversion.

The above advantages and other advantages, objects and features of the present invention will be readily apparent from the following detailed description of the preferred embodiments when taken in connection with the accompanying drawings.

BRIEF DESCRIPTION OF DRAWINGS

The objects and advantages described herein will be more fully understood by reading an example of an embodiment in which the invention is used to advantage, referred to herein as the Description of Preferred Embodiment, with reference to the drawings, wherein.

DETAILED DESCRIPTION

Figure 1A:
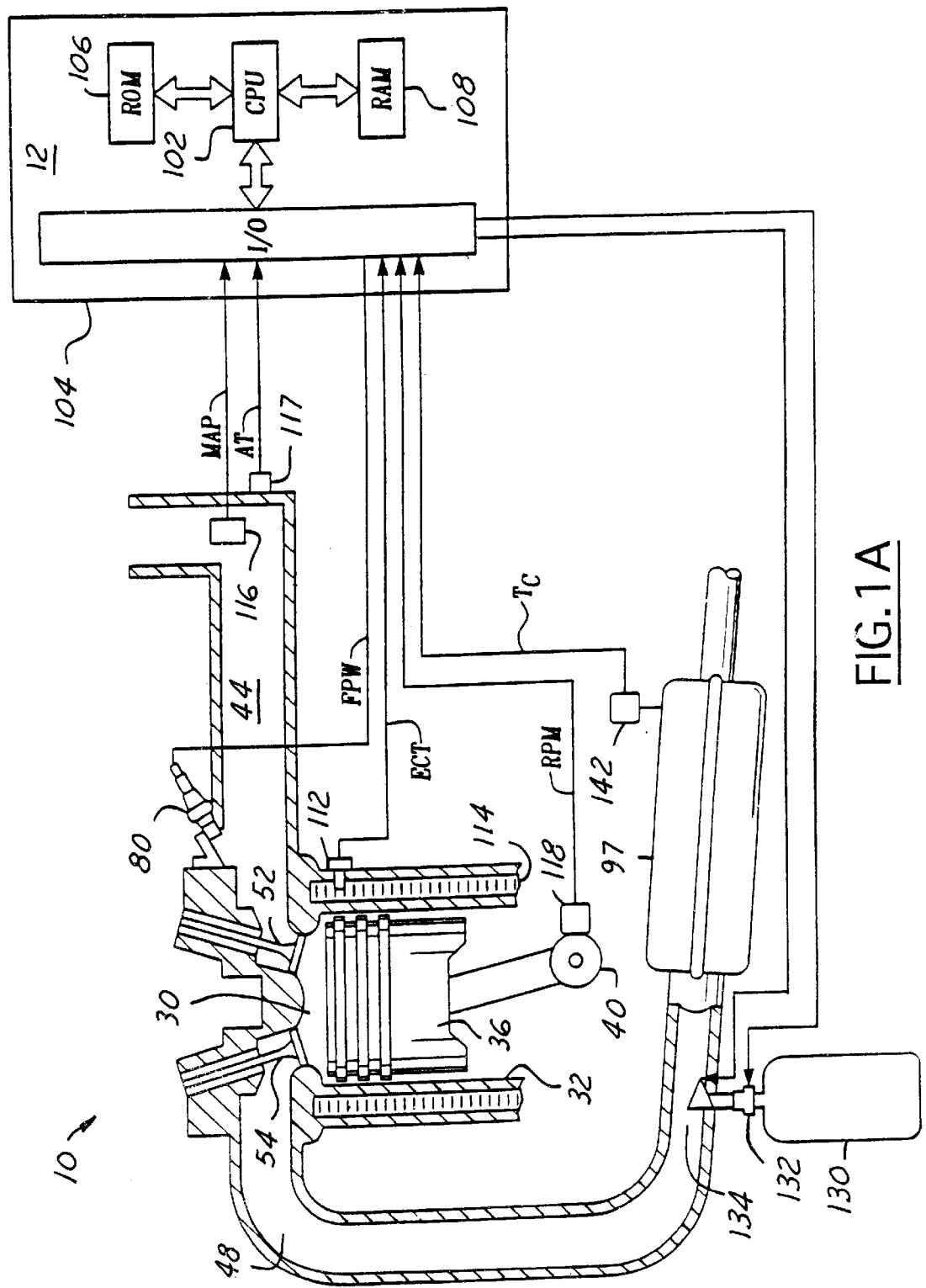
FIGS. 1A and 1B are schematic diagrams of an engine wherein the invention is used to advantage.
Figure 1B:
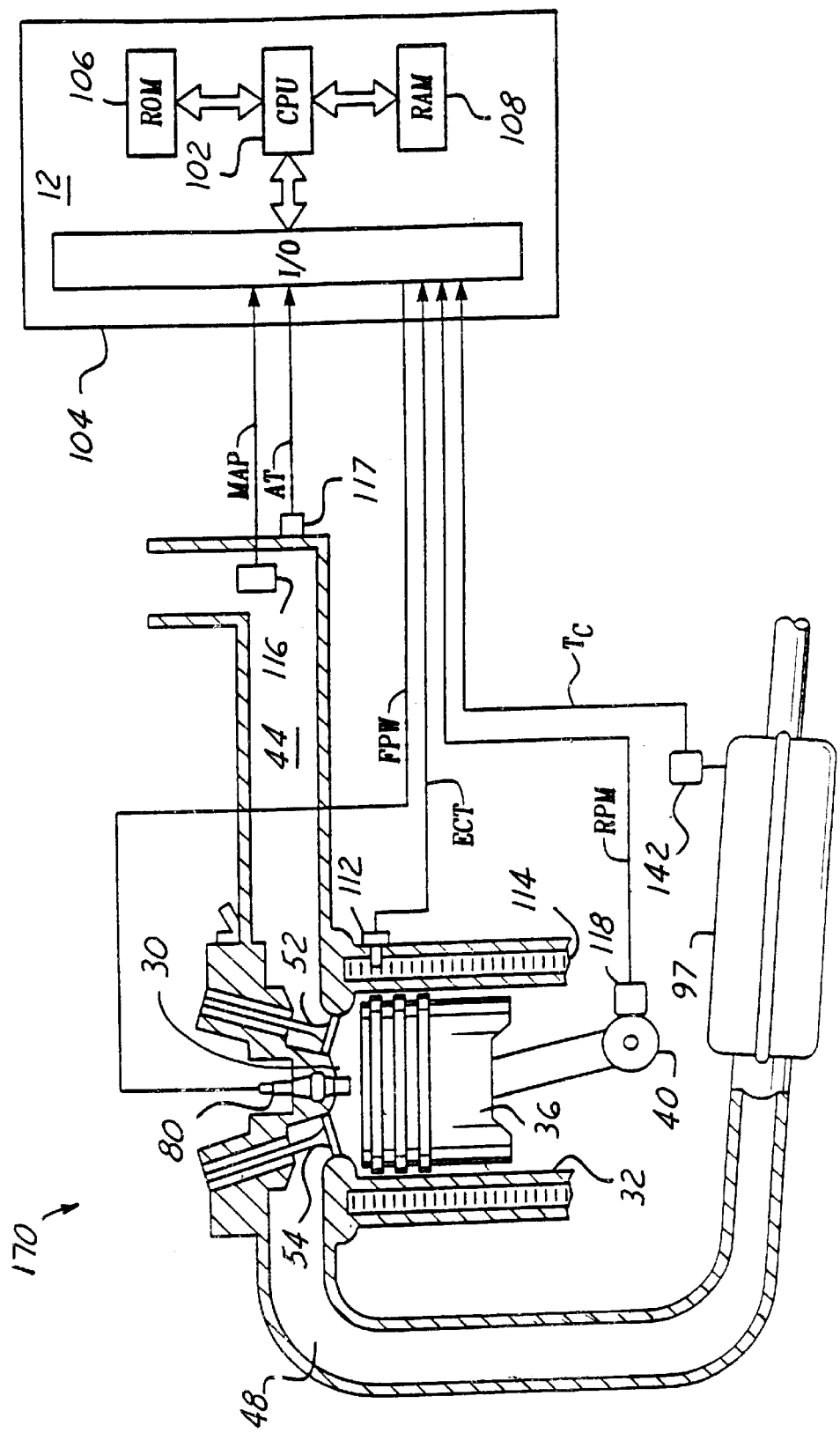

A block diagram illustrating an engine control system and method for two example representative internal combustion engines according to the present invention are shown in FIGS. 1A and 1B. As will be appreciated by those of ordinary skill in the art, the present invention may be used in a variety of lean burning internal combustion engines such as direct injection spark ignition (DISI) and diesel engines.

Internal combustion engine 10, comprising a plurality of cylinders, one cylinder of which is shown in FIG. 1A, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is also shown having fuel injector 80 coupled thereto for delivering liquid fuel in proportion to the pulse width of signal FPW from controller 12. Both fuel quantity, controlled by signal FPW, and injection timing are adjustable. Fuel is delivered to fuel injector 80 by a diesel fuel system (not shown) including a fuel tank, fuel pump, and fuel rail (not shown). Alternatively, the engine may be configured such that the fuel is injected directly into the cylinder of the engine, which is known to those skilled in the art as a direct injection engine.

Reducing agent, for example, urea or diesel fuel (HC), is stored in storage vessel 130 coupled to exhaust manifold 48 upstream of an Active Lean NOx Catalyst (ALNC) 97. In an alternative embodiment (not shown), diesel fuel can be stored solely in the fuel tank and supplied to the exhaust system via an injector into the exhaust manifold upstream of the ALNC. Also, catalyst 97 is an active lean NOx catalyst capable of reducing NOx in an oxygen rich environment. Efficiency of catalyst 97 is increased in the presence of a reducing agent on the substrate as well as in the exhaust gas entering the ALNC.

Control valve 134 controls the quantity of reducing agent delivered to the exhaust gases entering catalyst 97. Pump 132 pressurizes the reducing agent supplied to control valve 134. Both pump 132 and control valve 134 are controlled by controller 12. Temperature sensor 142 coupled to catalyst 97 provides an indication of the temperature (T) of catalyst 97. Alternatively, catalyst temperature (T) can be estimated based on exhaust gas temperature or other engine operating conditions.

Controller 12 is shown in FIG. 1A as a conventional microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold pressure (MAP) from pressure sensor 116 coupled to intake manifold 44; a measurement (AT) of manifold temperature from temperature sensor 117; an engine speed signal (RPM) from engine speed sensor 118 coupled to crankshaft 40.

Referring now to FIG. 1B, an alternative embodiment is shown where engine 170 is a direct injection engine with injector 80 located to inject fuel directly into cylinder 30. In this example, reductant, or diesel fuel, is delivered to the exhaust system by injector 80 during either or both of a power or exhaust stroke of engine 170.

Figure 2:
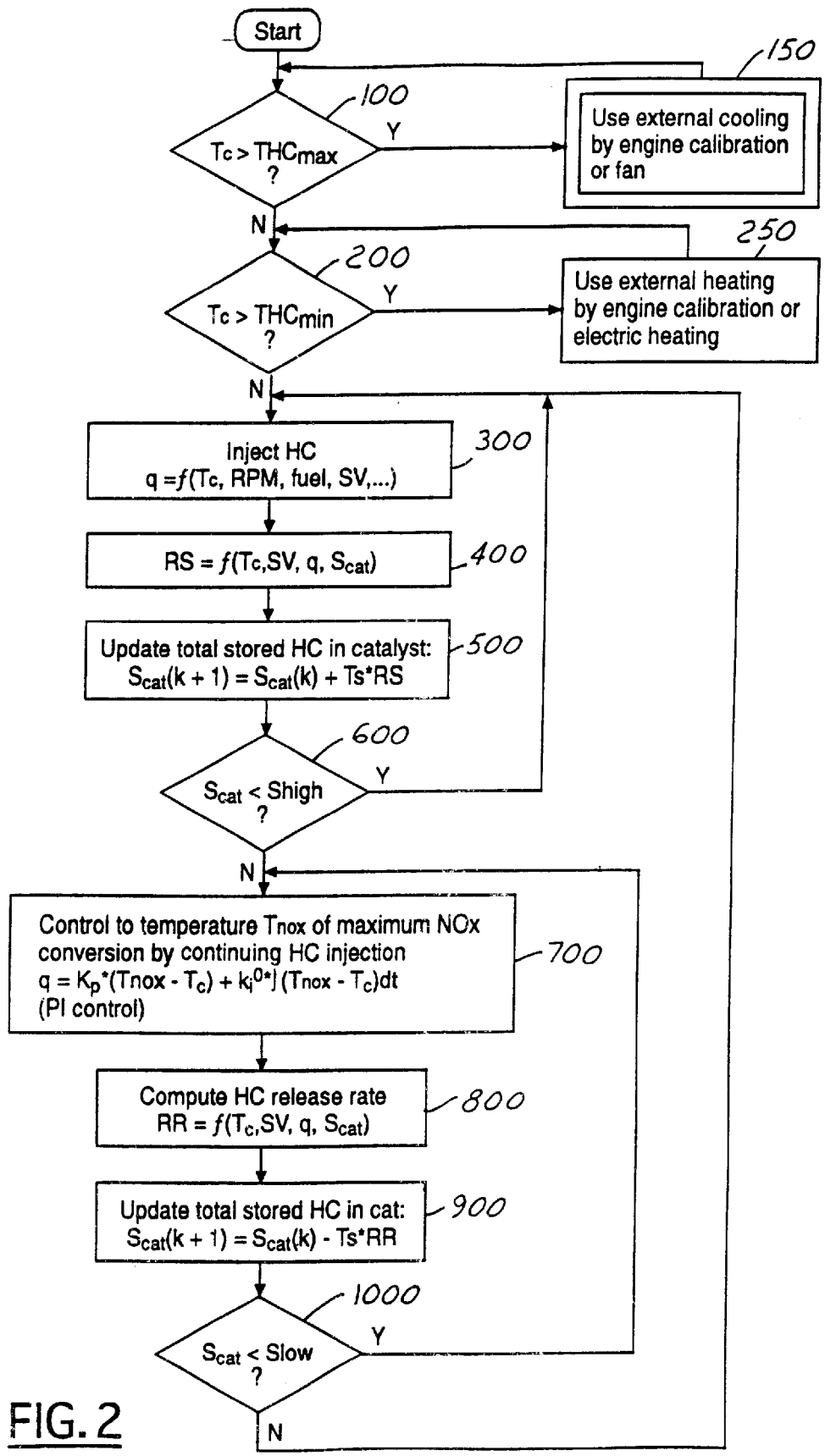
FIG. 2 is a block diagram of the embodiment in which the invention is used to advantage.

The diagram of FIG. 2 generally represents operation of one embodiment of a system or method according to the present invention. As will be appreciated by one of ordinary skill in the art, the diagram may represent any one or more of a number of known processing strategies such as event-driven, multi-tasking, multi-threading, and the like. Accordingly, various steps or functions illustrated may be performed in the sequence illustrated, in parallel, or in some cases omitted. Likewise, the order of processing is not necessarily required to achieve the objects, features, and advantages of the invention, but is provided for ease of illustration and description.

Referring now to FIG. 2, a routine is described for controlling the temperature of the ALNC to optimize NOx conversion efficiency in accordance with the present invention. In this embodiment, hydrocarbons (HC) are used as a NOx reductant. First, in decision block 100 a determination is made whether the ALNC temperature $T_C$ is above $THC_{MAX}$, which is the maximum effective temperature for hydrocarbon storage. If the answer to step 100 is YES, the routine proceeds to step 150 wherein engine operating parameters are adjusted in order to reduce the ALNC temperature below $THC_{MAX}$. This can be achieved, for example, by advancing ignition timing, which has the effect of lowering the exhaust gas temperature, or decreasing exhaust gas re-circulation (EGR) flow, or, alternatively, by applying an external cooling device. The routine keeps cycling through steps 100–150 until the answer to step 100 becomes NO, i.e., the ALNC has been cooled to temperatures below $THC_{MAX}$. The routine then proceeds to a decision block 200 wherein a determination is made whether the ALNC temperature is below $THC_{min}$, which is minimum effective temperature for HC storage (both the $THC_{MAX}$ and the $THC_{min}$ are dependent on chemical properties of the ALNC). If the answer to step 200 is YES, i.e., the ALNC temperature is below minimum effective for HC storage, the routine proceeds to step 250 wherein engine operating parameters are varied to effect heating of the ALNC. This can be achieved by retarding ignition timing, increasing EGR flow or, optionally, by external heating devices. If the answer to step 200 is NO, i.e., the ALNC temperature is within a range for most efficient hydrocarbon storage, the routine proceeds to step 300 wherein hydrocarbon injection is initiated. The rate of hydrocarbon injection, q, is computed as a function of ALNC temperature, $T_C$, and various engine operating conditions such as engine speed RPM, engine load, space velocity SV (calculated based on mass airflow or based on engine speed and intake manifold pressure), etc. Next, in step 400, hydrocarbon storage rate RS is computed as a function of $T_C$, SV, q, and $S_{CAT}$, which is a total amount of hydrocarbons stored in the ALNC per second. Next, in step 500 an integrator is used to update the total amount of HC stored in the ALNC according to the following equation:

$$S_{cat}(k+1) = S_{cat}(k) + T_S * RS,$$

wherein $T_S$ is a sample time. The routine then proceeds to decision block 600, wherein a determination is made whether the total amount of HC stored in the ALNC is greater than a predetermined value $S_{high}$, which is the maximum amount of HC to be stored in the ALNC for optimal NOx conversion efficiency. This is a calibratable value dependent on the properties of the engine and the catalyst. If the answer to step 600 is YES, i.e., the amount of total stored hydrocarbons has not reached an optimal value, the routine returns to step 300, wherein the injection of HC continues. If the answer to step 600 is NO, i.e., the optimal HC storage amount has been achieved, the routine proceeds to step 700 wherein additional amounts of HC are injected in order to increase the ALNC temperature to peak NOx conversion efficiency, $T_{NOx}$.

The rate of additional fuel injection required to raise the ALNC temperature to $T_{NOx}$ is calculated according to the following equation:

$$q = k_p * (T_{NOx} - T_c) + k_i * \int_0^t (T_{NOx} - T_c) dt$$

wherein $k_p$ is a proportional gain constant and $k_i$ is an integral gain constant. Increasing the ALNC temperature has the effect of releasing stored hydrocarbons, and therefore, in step 800 the HC release rate RR is calculated as a function of $S_{cat}$, SV, q and $T_C$. The routine then proceeds to step 900 wherein total amount of stored hydrocarbons is updated:

$$S_{cat}(k+1) = S_{cat}(k) - T_S * RR$$

Next, in step 1000, a decision is made whether the amount of stored hydrocarbons is above $S_{low}$ (a calibratable constant), i.e., whether the ALNC is still in the operating range for peak NOx conversion efficiency. If the answer to step 1000 is YES, i.e., the amount of stored hydrocarbons is still sufficiently high, the routine returns to step 700 wherein further hydrocarbon injection continues, which has the effect of increasing the ALNC temperature and further release of stored hydrocarbons. If the answer to step 1000 is NO, the routine returns to step 300. The rate of fuel injection can be lowered in order to lower the ALNC temperature to the range in which improved hydrocarbon storage is achieved.

Therefore, according to the present invention, it is possible to achieve improved NOx conversion efficiency of the ALNC by first keeping the ALNC within a temperature range at which a optimized storage of reductant can be achieved, and then driving up the temperature into the range where improved NOx conversion can be achieved. If the reductant is HC and ALNC temperature is at or above the temperatures at which exothermic reactions are possible, the HC will react exothermically with oxygen in the exhaust gas and the heat generated by the reaction can be used to increase the temperature of the ALNC. In other words, if the reductant is HC, NOx conversion efficiency of the ALNC can be improved by first operating in a lower temperature range and injecting hydrocarbons so that a predetermined amount is stored in the ALNC, then continuing hydrocarbon injection to drive up the ALNC temperature to its optimum NOx conversion range such that conversion efficiency can be improved by utilizing the benefits of stored hydrocarbons, and subsequently decreasing the injected hydrocarbon amount to lower the temperature into the range where the ALNC will store hydrocarbons again.

Alternatively, urea can be injected into the exhaust manifold and used as a NOx reductant in the ALNC. Under these circumstances, external heater and/or cooler may be required to raise and lower the temperature of the ALNC.

This concludes the description of the invention. The reading of it by those skilled in the art would bring to mind many alterations and modifications without departing from the spirit and the scope of the invention. Accordingly, it is intended that the scope of the invention be defined by the following claims:

I claim:

1. A method for improving conversion efficiency of an exhaust gas aftertreatment device coupled to an engine, the method comprising:

maintaining the device in a first operating temperature range to store a reductant while an exhaust gas entering the device is at an air-fuel ratio lean of stoichiometry; and subsequently maintaining the device in a second operating temperature range to release said stored reductant thereby reducing an exhaust gas component while said exhaust gas is at an air-fuel ratio lean of stoichiometry.

2. The method recited in claim 1 wherein the exhaust gas after-treatment device is an Active Lean NOx Catalyst.

3. The method recited in claim 1 wherein the engine is a direct injection spark ignition engine.

4. The method recited in claim 1 wherein the engine is a diesel engine.

5. The method claimed in claim 1 wherein said first operating temperature range is a range in which exothermic reactions between said reductant and oxygen are possible.

6. The method claimed in claim 1 wherein said second operating temperature range is a temperature range in which improved exhaust gas component reduction is achieved.

7. The method claimed in claim 1 wherein said exhaust component is NOx.

8. The method claimed in claim 1 wherein said reductant is hydrocarbon.

9. The method claimed in claim 1 wherein said reductant is urea.

10. The method claimed in claim 7 wherein said reductant is injected into a combustion chamber of the engine on an exhaust stroke.

11. The method claimed in claim 7 wherein said reductant is injected into a combustion chamber of the engine on a power stroke.

12. The method claimed in claim 8 wherein said reductant is injected directly into an exhaust manifold engine.

13. A system for improving conversion efficiency of an exhaust gas aftertreatment device coupled downstream of an engine, the system comprising:

the exhaust gas aftertreatment device; and a controller periodically adjusting a temperature of the device to be within a temperature range wherein improved storage of a reductant is achieved while an exhaust gas entering the device is at an air-fuel ratio lean of stoichiometry, and subsequently adjusting said device temperature to be within a temperature range wherein improved reduction of an exhaust gas component is achieved while an exhaust gas entering the device is at an air-fuel ratio lean of stoichiometry.

14. The system as set forth in claim 13 wherein the engine is a diesel engine.

15. The system as set forth in claim 13 wherein the device is an active lean NOx catalyst.

16. The system as set forth in claim 13 wherein said reductant is hydrocarbon.

17. The system as set forth in claim 13 wherein said reductant is urea.

18. The system as set forth in claim 13 wherein said exhaust gas component is NOx.

* * * * *